M. J. EAGAN.
Handles for Lifting or Carrying Boxes or Barrels.
No. 218,865. Patented Aug. 26, 1879.
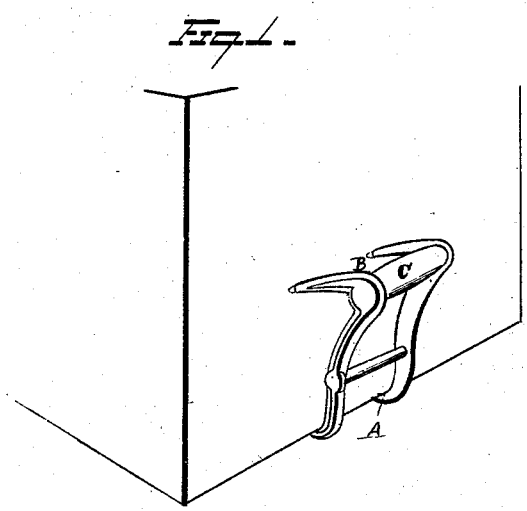
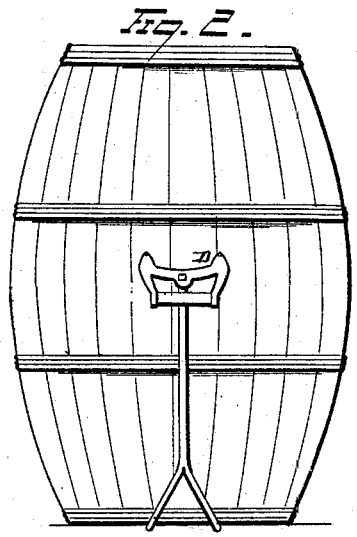
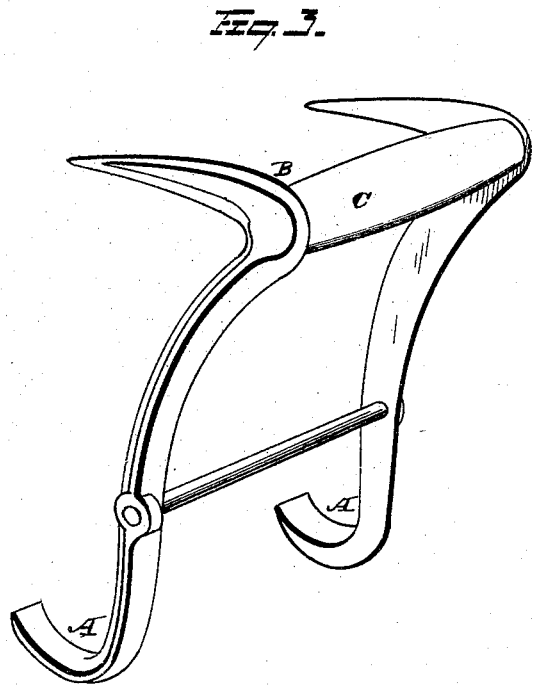
WITNESSES
E. J. Nottingham
A. W. Bright
INVENTOR
M. J. Eagan
By H. A. Seymour
ATTORNEY

UNITED STATES PATENT OFFICE.

MATTHEW J. EAGAN, OF GREENBUSH, ASSIGNOR OF ONE-HALF HIS RIGHT TO EVENS BACKUS, OF NASSAU, NEW YORK.

IMPROVEMENT IN HANDLES FOR LIFTING OR CARRYING BOXES OR BARRELS.

Specification forming part of Letters Patent No. 218,865, dated August 26, 1879; application filed July 3, 1879.

*To all whom it may concern:*

Be it known that I, MATTHEW J. EAGAN, of Greenbush, in the county of Rensselaer and State of New York, have invented certain new and useful Improvements in Handles for Boxes or Barrels; and I do hereby declare the following to be a full, clear, and exact description of the invention, such as will enable others skilled in the art to which it pertains to make and use it, reference being had to the accompanying drawings, which form part of this specification.

My invention relates to an improved handle for lifting or carrying barrels or boxes without injury to the hand, and with less difficulty than heretofore.

It consists, first, of a handle having one or more depending hooks, which engage with a box or barrel bottom, and provided with a rigid lateral bearing adapted to maintain said handle at a constant distance from the box or barrel side; second, of a handle having a hook or hooks which engage with a box or barrel bottom, and provided with one or more rigid points, prongs, or teeth adapted to securely engage with the box or barrel side, and also maintain said handle at a constant distance therefrom.

Referring to the drawings, Figure 1 is a view representing one form of the invention applied to raise a box. Fig. 2 represents a different form of the same invention applied to carry a barrel. Fig. 3 is a detail view, in perspective, of the handle shown in Fig. 1.

The depending hooks A are of suitable form to be inserted beneath the bottom or under side of a box or barrel, and be engaged therewith. I prefer them to be quite sharp at their points, so as to prevent any tendency to slip. Their shanks or intermediate connections B, to which the handle C is secured, may be of any suitable dimension, and longer or shorter. For lifting or carrying barrels I prefer the form shown in Fig. 2 of the drawings, whereby a single intermediate connection unites the hooks to the handle.

For lifting and carrying a filled barrel which is open at the top, the parts of the device should be made of such proportion that the prongs may engage with the barrel-side at a point above the longitudinal central portion of the barrel.

The handle is provided with a rigid lateral bearing, D, designed to come in contact with the side of the box or barrel, and thereby guard the hand therefrom. This bearing may be plane or blunt, and adapted merely to have frictional contact with the side of the box or barrel; or it may, on the other hand, be adapted to have pointed engagement with the said box or barrel side, and thereby serve the further purpose of preventing the handle from lateral slipping.

Different forms of construction capable of accomplishing this result may be adopted. The drawings show three modifications of the principle, and there may be one or more rigid prongs, points, or teeth, as desired.

Having fully described my invention, what I claim as new, and desire to secure by Letters Patent, is—

1. A handle having one or more depending hooks, which engage with a box or barrel bottom, and provided with a rigid lateral bearing adapted to maintain said handle at a constant distance from the box or barrel side.

2. A handle having a hook or hooks which engage with a box or barrel bottom, and provided with one or more rigid points, prongs, or teeth, adapted to securely engage with the box or barrel side, and also maintain said handle at a constant distance therefrom.

In testimony that I claim the foregoing I have hereunto set my hand this 20th day of June, 1879.

MATTHEW J. EAGAN.

Witnesses:
PETER SHEPPARD,
ROBERT J. SHEPPARD.